United States Patent [19]

Straten

[11] Patent Number: 4,843,719

[45] Date of Patent: Jul. 4, 1989

[54] PAIR OF MEASURING COMPASSES

[75] Inventor: Günter Straten, Siek-Meilsdorf, Fed. Rep. of Germany

[73] Assignee: Kiefer, Klaus, Jurgen and Straten, Gunter, Fed. Rep. of Germany

[21] Appl. No.: 112,474

[22] Filed: Oct. 22, 1987

[51] Int. Cl.[4] .............................................. B43L 9/00
[52] U.S. Cl. ................................................. 33/27.02
[58] Field of Search ............... 33/27.02, 27.03, 149 R, 33/152 R, 149 E, 153 B, 152 C

[56] References Cited

U.S. PATENT DOCUMENTS

| | | | |
|---|---|---|---|
| 1,235,715 | 8/1917 | Mouney | 33/152 R |
| 1,998,352 | 4/1935 | Bachmann | 33/149 R |
| 4,173,076 | 11/1979 | Gossage | 33/27.02 |

Primary Examiner—L. T. Hix
Assistant Examiner—Brian W. Brown

[57] ABSTRACT

In a two-legged pair of compasses the one leg (10) is provided with a measuring and mounting facility (40) which, at one of its ends (41), is linked to this leg (10) and which, at its other end (42), is provided with a scribing device (50), wherein the measuring and mounting facility (40) is provided with an aperture (43) through which a measuring ruler (60) on which lengthwise graduations (65) are applied can be passed which, with one of its ends (61) is detachably secured to the carrying element (21) of the other leg (20) and which projects with its other free end (62) that can be passed through the aperture (43), while on the measuring and mounting facility (40), a point-like configured indicator (44,45) which can be allocated to the longitudinal graduations (65) so that the thus necessary measuring of dimensions with the aid of measuring rulers is dispensed with (FIG. 1). The scribing device (50) is rotatably connected by means of an articulated member (53) around the vertical axis (H) with the measuring and mounting facility (40).

13 Claims, 3 Drawing Sheets

PAIR OF MEASURING COMPASSES

The present invention relates to a measuring compass comprising two hingedly connected legs, the first leg of which is provided with a steel point or centering needle as scribing device and the second leg with a supporting element connected by means of a joint and carrying a replaceable drawing insert, wherein the first leg is provided with a measuring and mounting facility which, at one of its ends, is linked to the first leg and, at its other end, is fitted with a centering element or scribing device, the measuring and mounting facility has an aperture through which a measuring ruler on which lengthwise graduations are applied can be passed which, with one of its ends, is detachably secured to the supporting element of the second leg and which projects with its other free end that can be passed through the aperture.

BACKGROUND OF THE INVENTION

Compasses or dividers are instruments for the drawing of cirles or curves, for the measuring of dimensions and the transferring of distances. The ordinary compasses consist of two hingedly connected legs, one of which is equipped with a steel point, while the other, in most cases provided with an additional joint, carries a replaceable drawing insert, such as a cartridge, a drawing pen or the like, which may frequently also be replaced with a second steel point. When working with compasses or dividers of this type, there often arises the problem of circles having certain radii having to be drawn where the adherence to the exact radius is of prime importance. In order to adhere to a pertinent accuracy, the known compasses have to be lined up against a measuring ruler provided with appropriate lengthwise graduations and the relevant graduation has to be measured in this case.

After that the compasses, provided they do not possess a locking device, have to be correspondingly carefully placed on the drawing plate or the like in order to there draw or scribe the relevant radius. However, when this is done, the pertinent elasticities of the legs which, by way of example, when the leg is pressed on, may lead to an inadvertent enlargement of the radius. Moreover, the measuring of predetermined radii dimensions constitutes an additional strain when drawing.

For this reason compasses have already been proposed in which the first leg is provided with a measuring and mounting facility which, at one of its ends, is linked to the first leg, and, at its other end, is provided with a scribing device, the measuring and mounting facility having an aperture through which a measuring ruler on which lengthwise graduations have been applied can be passed which, with one of its ends, is detachably secured to the carrying element of the second leg and which projects with its other free end which can be passed through the aperture (FR-PS No. 1.441.541).

Compasses are also already known on the one leg of which the one end of a measuring ruler is arranged which, with its other free end, can be passed through an aperture in the second leg (DE-PS No. 60665).

In another known embodiment of a pair of compasses provision is made for a pair of measuring compasses being pivotably arranged on one of the legs, while on the other leg a facility for reading the lengthwise graduations of the measuring ruler is disposed. However, in this case no exact assignment between the scribing spike of the leg and the lengthwise graduations of the measuring ruler is provided (DE-OS No. 34 42 675).

It is therefore the object of the present invention to further refine a pair of compasses in such a way that the measuring of the dimensions to be drawn or scribed can be dispensed with and that the dimensions to be set can be read off the compasses direct while avoiding elasticity influences in the compasses.

This technical problem is solved by the features characterized in claim 1.

SUMMARY OF THE INVENTION

By means of this construction a measuring compass is provided with the aid of which the hitherto necessary measuring of dimensions by measuring rulers is dispensed with and with which it will be possible to draw or scribe dimensions without that the elasticity properties inherent in the compasses give rise to a distortion of the measuring result. With this construction of the scribing device it is possible moreover, when drawing small circles or radii, to set the scribing spike so as to face inwardly, whereby the same is assigned to the relevant point-like configured indicator, while the scribing spike, when larger and largest radii are drawn, is assigned to the relevant other point-like configured indicator, to that a complete utilization of the maximum radius predetermined by the measuring ruler is possible. Beyond this, an optimum adaptation for supporting the compasses is feasible.

According to another preferred embodiment provision is made for the first leg and the second leg each being formed of thin, intertelescopable tubular portions, in which the tubular portions can be locked relative to one another in the sliding direction with the aid of locking screws. By means of this advantageous construction it is ensured that the compasses can be employed for the most widely differing fields of applications. If the compasses are to be employed only for the smallest radii and if also an appropriately small measuring ruler is provided, the telescopable legs are locked in their retracted position, whereas when used for large radii, the legs are locked in their extended position, it being possible to set them to any intermediate position without any difficulties. However, compasses with telescopable legs are known per se from the DE-PS No. 805 191.

According to a further preferred ambodiment provision has been made that, in the measuring and mounting facility, within the area of the aperture, a locking device constructed as a set-screw for locking in position and supportingly mounting the measuring ruler is detachably arranged. It is possible hereby to permanently set a drawing dimension which has been predetermined once so that, by way of example, any number of circles or radii of identical size can be drawn without a displacement having to be feared.

In the further preferred embodiment according to claim 5 there exists the possibility of employing different measuring rulers each time, as a result of which, on the one hand, the adaptability to the various systems of measurement is provided and, on the other hand, in particular in connection with the telescopable construction of the legs, the sphere of application of the compasses is substantially increased. Provided that the pair of compasses is then intended for the largest radii and is constructed possessing correspondingly large dimensions, provision has preferably been made for a small supporting wheel being disposed in a retracted fashion and pivotably supported on the shaped member oppoangle relative to one another, whereby a deep penetration of the scribing spike into a drawing support is avoided with certainty even if the pair of compasses is fairly heavy or if corresponding pressure is exerted on it by the draughtsman.

In order to make it possible for the advantages of the measuring ruler to be enjoyed in all areas of application, i.e. not only in technical drawing operations, but also in those cases where, by way of example, work is carried out not only with Chinese ink pens, but with color cartridges, chalks or the like as well, provision has been made in accordance with a preferred embodiment that, on the carrying element, a disk member is arranged pivotably supported around its center axis on a supporting device, said disk member being suitable for accommodating and detachably clamping a number of drawing inserts.

According to a preferred refinement, provision has been made for the mounting facility to consist of a plate-shaped, approximately rectangularly shaped member which, with one of its ends, is arranged on the carrying element and which, on its terminal section located opposite its end, is provided with a swivel joint for the rotatable mounting of the disk body, in which, on a longitudinal edge connecting the two ends, a mounting and locking plate featuring an angle relative to the shaped member is disposed either rigidly, detachably or mounted with the aid of a swivelling joint.

Further advantageous embodiments are characterized in the subclaims and described in the following.

BRIEF DESCRIPTION OF THE DRAWINGS

In the drawings, the subject matter of the invention is by way of example with

DETAILED DESCRIPTION OF THE PREFERRED EMBODIMENT

Figure 1:
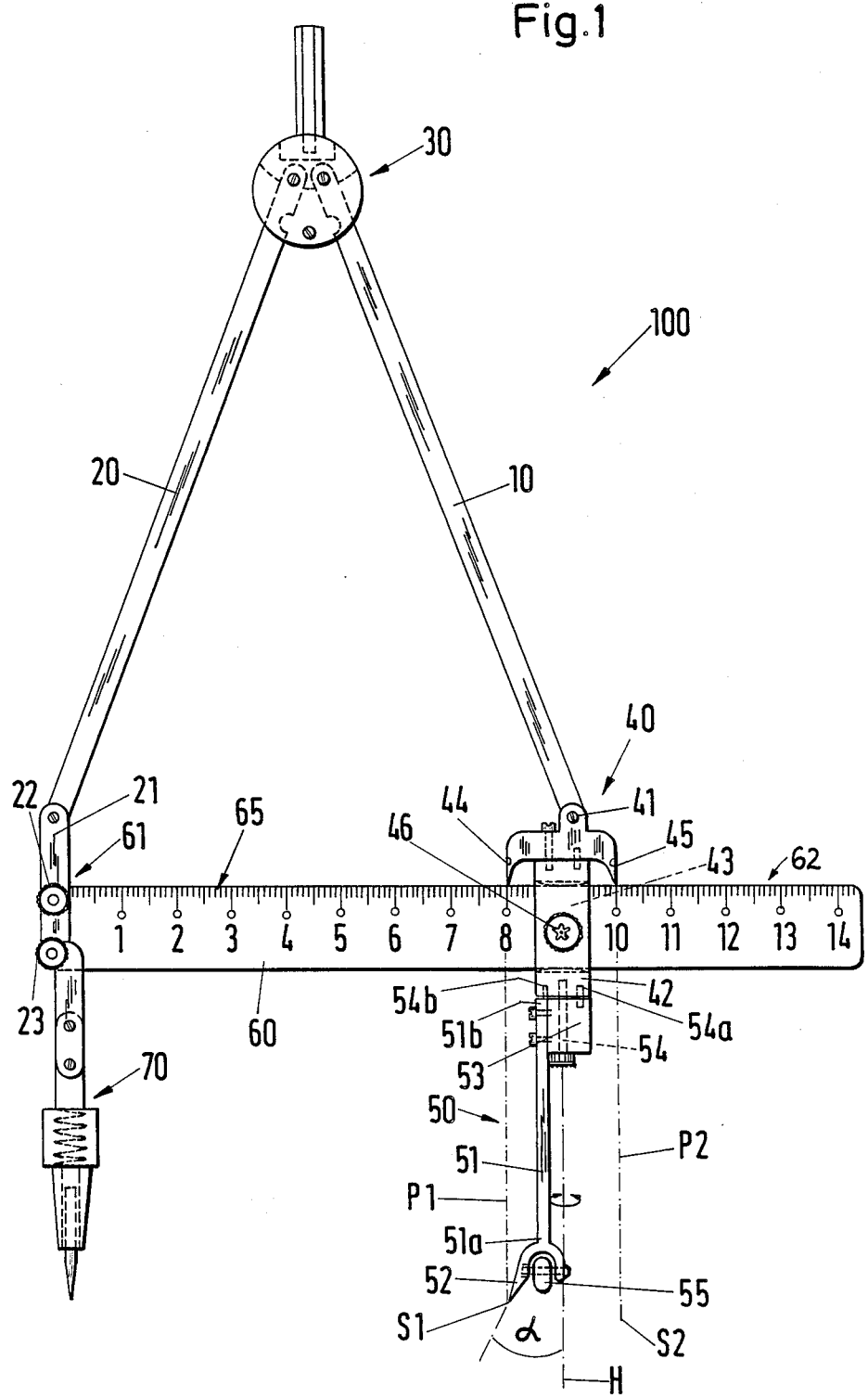
FIG. 1 showing the compasses in a side view.
Figure 2:
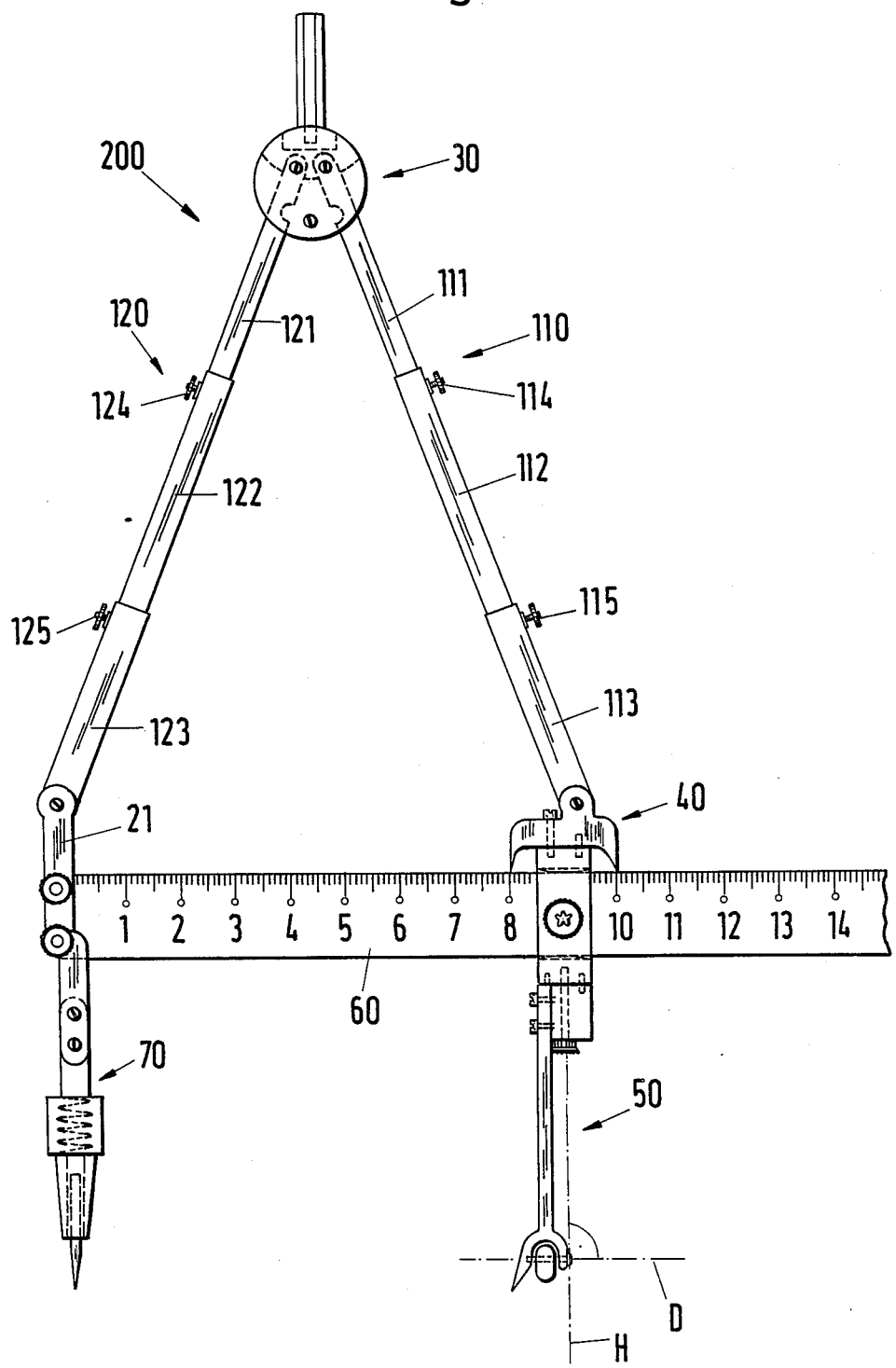
FIG. 2 showing a further embodiment of the compasses in a side view.

The measuring compass pair of compasses identified with 100 in FIG. 1 consists of two legs 10, 20, which are connected by a hinge 30 in a manner known per se. The measuring and mounting facility 40 is, with one of its ends 41, articulatedly connected with the leg 10 and consists of a shaped member formed in any desired way which is provided with an aperture 43 in such a way that a measuring ruler 60 on which lengthwise graduations 65 have been applied, can be passed freely displaceably through the aperture 43. On the lower end 42 of the measuring and mounting facility 40, the scribing or centering device 50 is disposed which is configured as a rodlike shaped member or centering element 51. Onto the end 51a of which facing away from the measuring and mounting facility 40, the scribing spike 52 is formed which forms an angle α of preferably 30° to the articulated member 53 which can be either formed on or screwed on which, by means of a pivot or an appropriately constructed screw 54, is rotatably coupled around the vertical longitudinal axis H on the measuring and mounting facility 40, whereby, by means of spring-loaded pins 54a, 54b, which engage in appropriate rrecesses, the articulated member 53 and, thereby, in the end, the scribing spike 52 can be locked in two positions S1, S2, respectively, which lie in the swivelling plane of the leg and are displaced by 180°. On the shaped member 51, parallel to the scribing spike 52, a small supporting wheel 55 is arranged in a retracted fashion and pivotably supported, the axis of rotation D of which lies preferably in the swivelling plane of the leg and forms a right angle with respect to the vertical longitudinal axis H (FIG. 2).

Within the area of the aperture 43 the measuring and mounting facility 40 is provided with one or two pointedly configured indicators 44, 45 which are assigned to the lengthwise graduations of the measuring ruler 60. The point-like configured indicators 44, 45 lie preferably in a plane P1 or P2 at right angles to the swivelling plane of the leg and parallel to the vertical longitudinal axis H so that a direct assignment of the scribing spike 52 to the lengthwise graduations 65 on the measuring ruler 60 is practicable.

The measuring ruler 60 is, with one of its ends 61, detachably secured to carrying member 21 of the second leg 20 and is, with its other free end 62 that can be passed through aperture 43, projectingly arranged. When leg 10 is moved, the measuring ruler travels through the aperture 43. If a specific dimension indicated by one of the point-like configured indicators 44, 45 on the measuring ruler 60 is to be adhered to, then a set-screw 46 is locked so that a displacement of the measuring ruler within the aperture 43 is prevented.

On the carrying element 21, on which the replaceable drawing insert 170 is arranged, the measuring ruler is attached with the aid of set-screws or locking screws 22, 23 so that a replacement of the measuring ruler 60 with another bearing different lengthwise graduations is possible.

A further embodiment of the pair of compasses 200 is depicted in FIG. 2 in which the legs 110, 120 can be locked in position. For this purpose, the legs 110, 120 are each constructed of thin, intertelescopable tubular portions 111, 112, 113, 121, 122, 123 and the tubular portions 111, 112, 113, 121, 122, 123 can be locked relative to one another in the sliding direction by means of locking screws 114, 115, 124, 125. The measuring and mounting facility 40, the scribing device 50, the measuring ruler 60 and the drawing insert 70 arranged on the carrying element 21 are constructed in an identical manner as in the pair of compasses according to FIG. 1.

Figure 3:
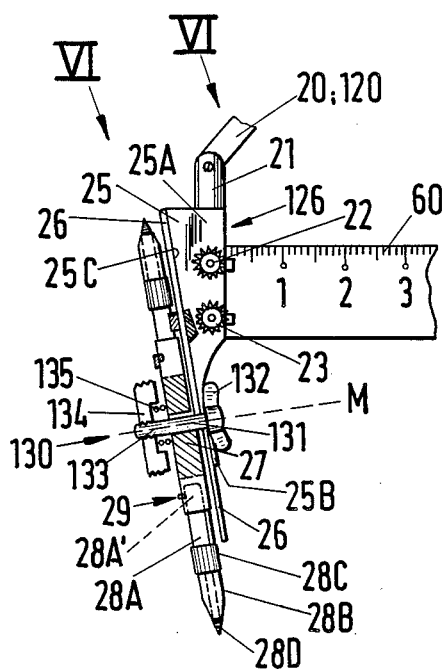
FIG. 3 showing the disk member carrying a number of drawing inserts with its connection to the non-depicted measuring ruler in a vertical sectional representation, FIG. 4 showing the disk member according to FIG. 3 in a complete front view, FIG. 5 showing a further embodiment of a drawing insert, and FIG. 6 showing a view of the supporting device 126 according to VI—VI in FIG. 3 in a view from the top.
Figure 4:
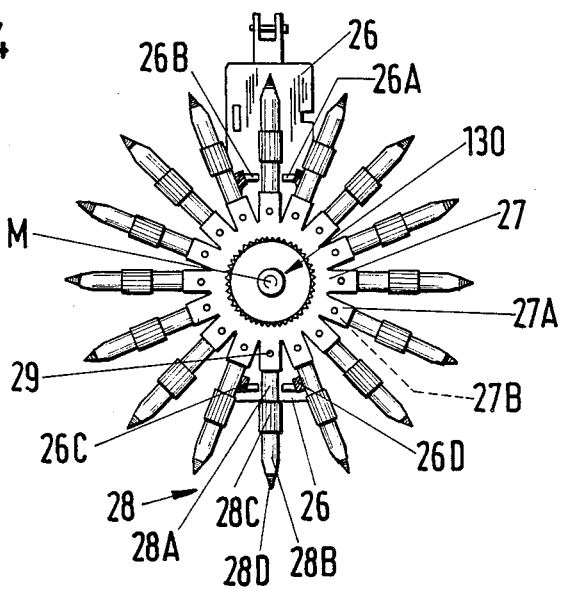

In the FIGS. 3 and 4, a preferred embodiment of the pair of compasses is illustrated in which a disk member 27 disposed on the carrying element 21 of the second leg 20; 120 bears a number of drawing inserts 28 which are detachably mounted on the disk member 27 by means of an engaging facility 29.

The disk member is in this case mounted on a shaped member 25 as a carrying member which is disposed on the carrying element 21 and bears the locking screws 22, 23 for the measuring ruler 60 and which possesses a plate-shaped, approximately rectangular shape. The one end 25a is arranged on the carrying element 21, while the other end is constructed as a terminal section 25b supporting a swivel joint 130. On the longitudinal edge 35c of the shaped member 25, a mounting and locking plate 26 is disposed which forms a right angle relative to the shaped member 25 and upon which arresting pins 26a–d are mounted in such a way that they serve to effect the lockable mounting of the disk member 27.

The disk member 27 possesses a circular, disk-like basic construction, in which are provided on its outer rim in symmetrical arrangement, a number of retention recesses 27a corresponding to the number of drawing inserts 28; 128 to be clampingly retained. These retention recesses 27a consist in each ase of a trepanned bore 27b into which an inserting section 28a' of a retention member 28a; 128a of the drawing inserts 28; 128 is insertable, the inserting section 28a' being rigidly mounted with the aid of an appropriately constructed engagement facility 29 in the hollow bore 27b of the retention recess 27a.

Figure 5:
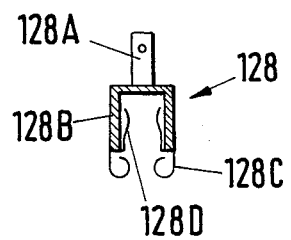

As drawing inserts in this case the drawing inserts 28 shown in the FIGS. 3 and 4 may be employed which consist of a retention member 28a and a cartridge accommodation means 28b, into which a cartridge 28d can be inserted and clamped fast by means of a locking screw 28c. In this case the cartridge 28b may be a pencil or color cartridge, however, the use of an appropriate ball pen point, felt pen point, copying pencil point or the like is likewise possible. It is also possible, however, to employ the drawing insert 128 depicted in FIG. 5, which consists of the retention member 128a which is insertable into the accommodation means 27a in the manner described in the foregoing, of an accommodation mounting B and retaining spring 128c disposed thereon in a suitable fashion. But apart from the retaining spring 128c, it is also possible to arrange other rapidly detachable clamping devices such as a spring-loaded clamping sphere or an appropriately arranged spring steel plate as has been indicated at 128d.

The disk member 27 is pivotably arranged on the mounting and locking plate via the swivel joint 130. In this case the swivel joint consists of the threaded bolt 131 which, at one of its ends, is rigidly fitted with a butterfly nut head 132, and, at its other end penetrating the shaped member 25 and the mounting and locking plate 26, has a threaded section 133. The threaded section 133 projects to such an extent that a screw 24 provided with an easily gripped, knurl-like peripheral surface can be screwed onto the same, between the nut 134 and the disk member 27, a spring facility conceived by way of example as a compression spring 135 or as a spring plate, is disposed.

In order to adjust the disk member, the nut 134 is loosened slightly and the disk member 27 is raised in such a way that the relevant retention members 28a of the drawing inserts 28 are conveyed out of the interspace between the arresting pins 26a, 26b or 26c, 26d, and a rotation of the disk member 27 is possible. The disk member 27 is then rotated to such an extent until the desired setting is reached, i.e. until the desired cartridge 28d points downwardly. After that the relevant retention members 28a slide again between the pertinent arresting pins 26a, 26b or 26c, 26d and are, by the action of the spring 135, securely retained between them. In this manner a simple replacement of, by way of example, cartridges of different colors or different line thicknesses is possible.

Figure 6:
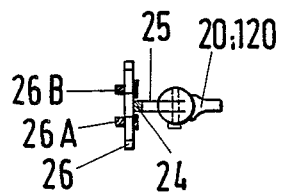

It is furthermore possible to arrange the mounting and locking plate with respect to the shaped member 25 swivellably via a joint 24 as has been indicated in FIG. 6. In this case it is possible to make provision for a swivelling motion both around the vertical axis as well as also around the horizontal axis.

The invention is not restricted to the embodiments depicted and described in the foregoing. Since significant inventive concepts exist in the telescopability of compasses components and in the arrangement of a measuring ruler, the telescopable construction of other parts of the compasses likewise lie within the scope of the invention as another arrangement of a measuring ruler achieving the same effect.

What is claimed is:

1. A measuring compass comprising a pair of first and second legs (10; 110 and 20; 120) pivotally connected at first ends thereof, a centering device (50) carried by one of the legs (10; 110 and 20; 120) and including a centering element (51) having a pointed end, a marking device (70) carried by the other of the legs (20; 120) and including at least one marking element having a marking end disposed in a marking position, means for releasably securing the legs (10; 110 and 20; 120) in fixed position relative to each other, a measuring member (60) carried by one of said legs and having graduations (65) therealong and indicating means carried by the other of the legs and cooperating with the graduations to indicate linear distance between the pointed end and the marking end, characterized by means for supporting said centering element (51) for angular movement relative to said one leg about an axis (H) between first and second positions (S1 and S2) relative to said one leg with said pointed end spaced radially outwardly from said axis (H) and wherein said indicating means includes a first indicator (44) for cooperating with said graduations (65) to indicate the linear distance between said marking end and said pointed end when said centering element (51) is in said first position (S1) and a second indicator (45) for cooperating with said graduations (65) to indicate the linear distance between said marking end and said pointed end when said centering element (51) is in said second position (S2).

2. A measuring compass according to claim 1 wherein said pointed end is located between said marking end and said axis (H) when said centering element (51) is in its first position (S1) and said pointed end is located at the opposite side of said axis (H) from said marking end when said centering element (51) is in its second position (S2).

3. A measuring compass according to claim 2 wherein said second position (S2) is angularly displaced 180° about said axis (H) from said first position (S1).

4. A measuring compass according to claim 1 wherein said marking device includes means for releasably securing said one marking element to said other leg (20; 120).

5. A measuring compass according to claim 1 characterized in that said first and second legs (110 and 120) are of adjustable length.

6. A measuring compass according to claim 4 characterized in that said first and said second legs (110 and 120) are formed by a plurality of telescopically adjustable tubular portions (11; 112 and 121; 122) and said measuring compass includes means (114; 124) for releasably securing said tubular portions in selected positions of adjustment.

7. A measuring compass according to claim 1 wherein said measuring member (60) comprises a detachable member releasably secured to said supporting element (21).

8. A measuring compass according to claim 1 wherein said marking device comprises a disk member (27) supported for pivotal movement about a central axis (M) relative to said other leg (20; 120) and a plurality of marking elements supported on said disk member (27) for selective movement with said disk member (27) and to said marking position.

9. A measuring compass according to claim 1 characterized by supporting means for limiting penetration of an associated supporting surface by said pointed end.

10. A measuring compass according to claim 1 further characterized by supporting means comprising a supporting wheel carried by said center element (50) and journalled for rotation about a support axis (D) intersecting said axis of rotation (H).

11. A measuring compass according to claim 1 further characterized by means for releasably retaining said centering element (51) in said first position (S1) and in said second position (S2).

12. A measuring compass comprising a pair of first and second legs (10; 110 and 20; 120) pivotally connected at first ends thereof, a mounting member (40) pivotally connected to the second end of said first leg (10; 110) and having an aperture (43) therethrough, an articulated member (53) supported on said mounting member (40) for rotation about an axis (H) disposed generally within a plane defined by said legs, a rod-like centering element (51) secured to and projecting from said articulated member (53) and including a spike (52) on the free end thereof having a pointed end spaced radially outwardly from said axis (H), said centering element being supported for angular movement with said articulated member (53) about said axis (H) between a first position (S1) and a second position (S2) angularly offset 180° from said first position, means for releasably retaining said centering element (51) in said first position (S1) and in said second position (S2) a carrying member (21) pivotally connected to the second end of said second leg (20, 120), a marking device mounted on said carrying element (21) including at least one marking element having a marking end, a measuring member (60) releasably secured at one of its ends to said carrying member (21) and having graduations (65) therealong, said measuring member (60) extending through said aperture (43), means (46) on said mounting member (40) for releasably securing said measuring member (60) in fixed position relative thereto, said indicating means comprising a first indicator (44) secured to said mounting member (40) for cooperating with said graduations to indicate the linear distance between said pointed end and said marking end when said centering element (51) is in its first position (S1) and a second indicator (45) for cooperating with said graduations when said centering element (51) to indicate the linear distance between said pointed end and said marking end when said centering element (51) is in its second position (S2).

13. A measuring compass comprising a pair of first and second legs (10; 110 and 20; 120) pivotally connected at first ends thereof, a measuring and mounting element (40) connected to the second end of first leg (10; 110), a supporting element (21) connected to the second end of said second leg (20; 120), a centering element (51) mounted on said measuring and mounting element (40) and having a pointed end, a marking member (70) carried by said supporting element (21) and having a marking end, an elongated measuring element (60) secured to said supporting element (21) and having graduations (65) therealong, means for releasably securing said measuring element (60) to said measuring and mounting element (40) and indicating means mounted on said measuring and mounting element (40) for cooperating with said graduations (65) on said measuring element (60) to indicate the distance between said pointed end and said marking end and further characterized by means supporting said centering element (51) on said mounting and measuring means for rotation about an axis (H) between first and second positions wherein said pointed end is disposed within a plane defined by said axis and said marking end, said pointed end in its first position being disposed to the same side of said axis (H) as said marking end, said pointed end in said second position being disposed at the opposite side of said axis (H) from said marking end, and said indicating means comprises means for indicating the distance between said pointed end and said marking end in said first position and in said second position.

* * * * *